D. BEST.
GAS ENGINE AND GENERATOR.
No. 11,633. Reissued Oct. 12, 1897.
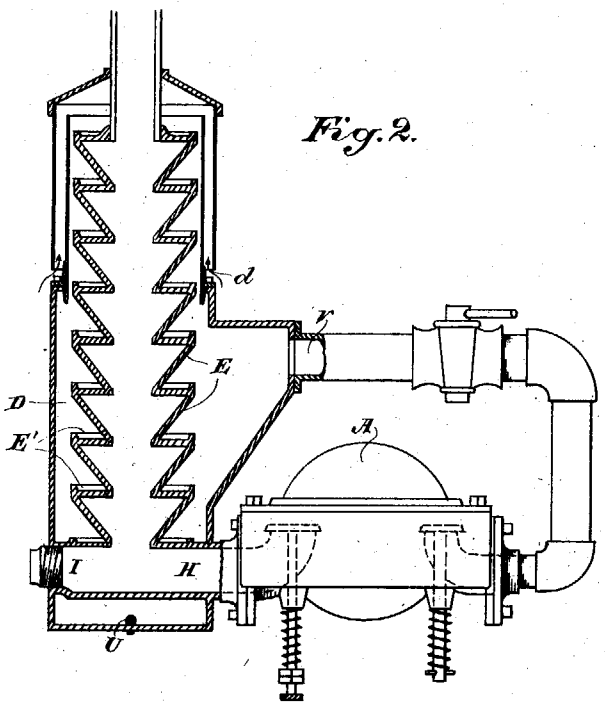
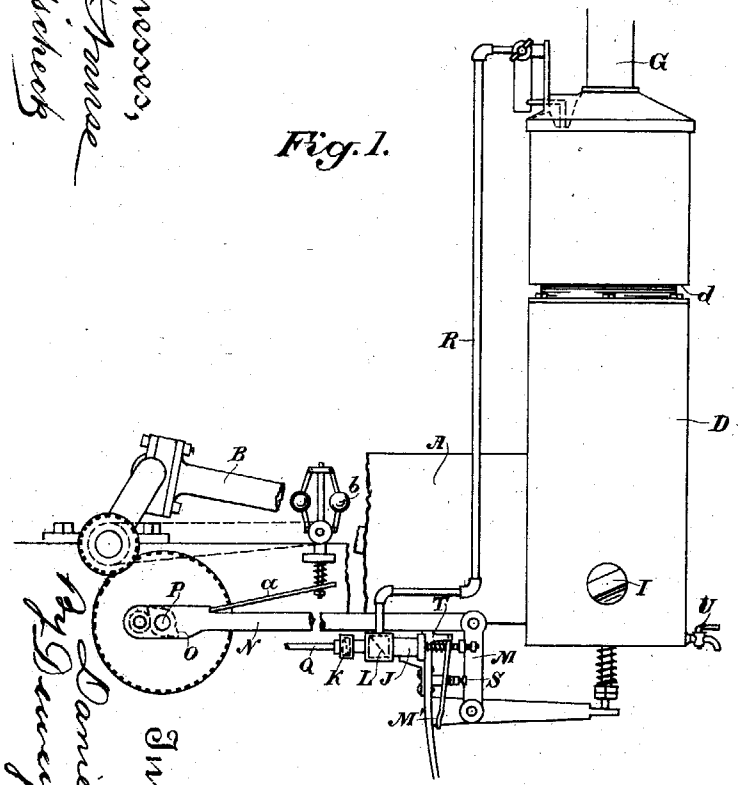
Witnesses,
P. Towse
H. F. Ascheck
Inventor
Daniel Best
By Dewey & Co.
Attys

UNITED STATES PATENT OFFICE.

DANIEL BEST, OF SAN LEANDRO, CALIFORNIA.

GAS ENGINE AND GENERATOR.

SPECIFICATION forming part of Reissued Letters Patent No. 11,633, dated October 12, 1897.

Original No. 544,879, dated August 20, 1895. Application for reissue filed April 8, 1897. Serial No. 631,331.

*To all whom it may concern:*

Be it known that I, DANIEL BEST, a citizen of the United States, residing at San Leandro, county of Alameda, State of California, have invented an Improvement in Gas Engines and Generators; and I hereby declare the following to be a full, clear, and exact description of the same.

My invention relates to certain improvements in gas-engines and means for supplying them with an explosive gas or vapor; and it consists of certain details of construction, which will be more fully explained by reference to the accompanying drawings, in which—

Figure 1 is an exterior elevation of the apparatus with part of engine, showing its connection therewith. Fig. 2 is a vertical section of generator with end view of engine-cylinder and connecting-pipes.

The object of my present invention is to provide a convenient means for supplying an explosive gas or vapor to a gas-engine directly from the crude petroleum or hydrocarbon chamber containing it, and to supply the hydrocarbon to the generator in small continuous charges, and drawing off the residue as fast as it accumulates.

A is the gas-engine cylinder, which may be disposed either horizontally or vertically, having a piston reciprocating therein, a connecting-rod B, uniting it with a crank upon the crank-shaft, and mechanism by which the valves are actuated to admit the explosive vapor and air, and also to exhaust the waste products after the explosion has taken place.

I do not limit or confine myself to any particular form of engine or valve mechanism, as my apparatus is applicable to any form by the use of ordinary mechanical skill; but in the present illustration the exhaust-valve is closed by a spring when the engine-piston is drawing in a supply of explosive gas, and is opened by a cam O on the shaft P, acting through connecting-rods upon the exhaust-valve stem at the proper time. It is held open and the cam prevented from acting when the speed becomes great enough by an arm *a*, actuated by a governor *b*, so as to engage a lug or notch on the rod N, and is released therefrom when the speed decreases.

The generator consists of an exterior casing D, having formed within it a series of inverted cones E, which are united so as to stand successively one above the other. Exterior of the upper portion of the generator and concentric therewith, to form a circumscribing space, is a shell or casing, open at its lower end to form an inlet *d* for air to be supplied to the interior of the generator.

In the series of cones, Fig. 2, the smaller portion of each of the cones is presented downwardly, and they diverge from this point upwardly to an approximately flat retaining-surface, as shown at E, having a slightly-raised rim or flange E′ surrounding it. Through the center of these cones is a vertical passage G, open at the top and extending into the lowermost of the cones, which is closed at the bottom. Through the sides of the exterior casing extend pipes or passages H and I, connecting with the interior of the lower cone, as shown.

The passage I is ordinarily closed by a plug and is opened for the introduction of any combustible to heat the generator before starting, after which it is closed and the exhaust supplies sufficient heat.

The pipe H connects directly with the exhaust-pipe from the engine and the hot products of combustion are delivered directly into the lower cone, passing thence upwardly through the vertical pipe or passage G. The cones are all heated to a degree which is sufficient to vaporize the volatile portion of the hydrocarbon product, which is distributed thinly over the surface of the cones.

The material is first delivered upon the uppermost tabular surface, and as it flows over the rim or edge passes down upon the outside of the conical surface and is delivered upon the tabular surface below. When this is filled, the material again flows over its rim, passing down upon the outside of the next cone, and so on until it reaches the lowermost one, from which any residue falls off into the lower part of the exterior casing. The material is supplied by means of a pump J, having inlet and outlet check-valves K and L. This pump is in the present case shown as connected with the bell-crank lever M, which serves to open the exhaust-valve of the engine, this bell-crank lever being actuated by a rod or arm N, which is reciprocated by means of a cam O upon the shaft P when the engine is in operation. A hand-lever M' is so fulcrumed and connected with the pump-plunger that the latter may be operated by hand when the engine is not running, and an adjusting-screw S regulates the length of the stroke of the plunger, and the consequent supply of oil. A pipe Q leads from a reservoir or source of supply and delivers the hydrocarbon oil to the pump, and as the latter reciprocates it draws in a small quantity, forces it outwardly through the pipe R, which delivers it into the upper part of the generator-casing to pass down over the cones, as previously described.

The pump being connected with the mechanism by which the exhaust-valve is opened and closed, it will be manifest that it will be actuated simultaneously with this mechanism, and when the exhaust-valve is held open by the governor connections, so as to allow air to freely enter and be expelled by the reciprocation of the engine-piston when the speed of the engine is as great as is desired, the pump will temporarily cease to operate and no oil will be pumped into the generator; but as soon as the exhaust-valve mechanism is released, so that the exhaust-valve is allowed to close and the inlet-valve operates to supply vapor to the engine, the pump will again be set into operation by the reciprocation of the connected parts and will again pump a small quantity of the liquid into the generator. The object of this is to supply the liquid to the generator, while it is necessary to supply the explosive vapor to the engine and cut off the supply whenever the engine is running fast enough to temporarily cut off the supply of vapor. A spring T surrounds the plunger-stem and returns it after it has been forced inwardly by the action of the actuating-lever. This operation will continue as long as the engine is at work, and heat from the exhaust is supplied to vaporize the hydrocarbon liquid.

Whenever the engine stops, vapor will cease to be produced in any considerable quantity and the engine may be started at any time as long as there is sufficient heat to generate the necessary amount of vapor.

When the engine is to be first started and when the parts are cold, the passage I, which opens into the lower part of the generating-cones, is opened and any combustible is introduced into the interior vertical passage of the cone until the latter is heated to a sufficient degree to commence vaporizing the hydrocarbon liquid, after which the passage I is closed and thereafter the heat from the exhaust of the engine will be sufficient for this purpose.

In the lower part of the exterior casing a small opening U is made, and through this opening the liquid remaining after the vaporizing process within the generator will trickle out and can be caught in any suitable receptacle. This liquid, without any further treatment, makes a superior lubricating-oil. By this construction and the employment of retaining-tables over which the crude petroleum is allowed to flow, and a means for supplying the petroleum, which is governed by the movements of the engine, I am enabled, first, to supply the crude petroleum as fast as the volatile elements can be separated from the heavier carbon and to immediately stop the supply whenever the engine stops, retaining that portion in which the separation is not complete, until the apparatus is again started. Secondly, the lighter hydrocarbon vapor or gas is diverted into the engine where it is to be used entirely clear of the heavier non-volatilizable liquid.

Having thus described my invention, what I claim as new, and desire to secure by Letters Patent, is—

1. The combination, with a gas-engine having a horizontally-reciprocating piston, inlet-valves for an explosive mixture and an exhaust-valve through which the products of combustion are discharged, and by the opening and closing of which the action of the inlet-valve is controlled, a vertically-disposed generator adapted to produce an explosive gas or vapor from a hydrocarbon liquid which is fed thereto, a bell-crank lever having a horizontal arm to operate the exhaust-valve and a vertical arm connected with the horizontal reciprocating rod, a pump connected with the bell-crank lever at a point between its fulcrum and the outer end of its vertical arm, and operated by the movement of the reciprocating rod, and a pipe leading from a source of supply to the pump and from the latter to the upper portion of the generator.

2. The combination, with a gas-engine having a horizontally-reciprocating piston, inlet and exhaust valves and a governor, of a vertically-disposed generator consisting of an exterior case, an interior series of superposed and connected cones extending throughout the casing, with a vertical passage centrally through the series of cones, communicating at one side of its lower end with the passage from the exhaust, and opening through the top of the exterior case, a bell-crank lever having horizontal and vertical arms the horizontal one of which actuates the exhaust-valve while the other arm is actuated by the reciprocating rod, a pump having a stem connected with the lever at a point between its fulcrum and the outer end of its vertical arm, and a pipe for conveying the hydrocarbon from the pump to the exterior surface of the uppermost cone.

3. In combination with a gas-engine and a pumping mechanism actuated thereby, a generator consisting of an exterior case, a series of cones formed and inclosed within the case, said cones being inverted with the smaller portion of one connected with the larger portion of another whereby retaining-surfaces are formed at the junction of connected cones, each of said surfaces being surrounded by a raised rim or flange over which the liquid flows so as to be distributed down the outside of the cones, a pipe or passage connecting the interior of the cones with the exhaust from the engine, and a pipe or passage through the whole series of cones leading out through the exterior casing.

4. The combination, with a gas-engine, of a generator consisting of an exterior casing, a series of cones therein with their smaller portions presented downwardly, and connected with the larger portions of contiguous cones, each of said larger portions serving as a flat tabular surface, with a raised surrounding flange, said cones being hollow to form a vertical passage-way through the entire series with the passage at one end connecting with the exhaust from the engine, and at the opposite end leading out through the exterior casing, and another passage with a closing door adapted to be opened for the introduction of a heating device for initially heating the generator.

5. The combination with a gas-engine, of an independent vaporizer or generator and separator connected therewith and combined in a single apparatus, said vaporizer or generator adapted to supply explosive vapor to the engine when the latter is running and to arrest the flow when the engine stops.

6. The combination with a gas-engine, of an independent vaporizer or generator and separator combined in a single apparatus, said vaporizer or generator having inclosed imperforate retaining-surfaces over which the liquid to be vaporized will flow while the engine is in motion, and by which the flow is arrested when the engine stops.

7. The combination with a gas-engine, of a vaporizer or generator having inclosed imperforate retaining-surfaces over which the liquid to be vaporized will flow while the engine is in motion and will cease to flow when the engine stops, said vaporizer provided with means for retaining the crude oil and causing it to separate from the vapor which is supplied to the engine-cylinder.

8. The combination with a gas-engine, of inclosed imperforate retainers exterior to the engine, means by which the liquid to be vaporized is caused to flow over said surfaces while the engine is running, and is arrested when the engine stops, passages through which the hot exhaust products from the engine are delivered to vaporize the liquid and independent discharge-passages for the vapor and the residue.

9. In combination with a gas-engine, a gas or vapor generator consisting of tabular imperforate retaining-surfaces, a device by which the crude petroleum is delivered upon the tables while the engine is running, and where it is heated so as to separate the gas or vapor from the heavy oil, a passage through which the vapor is conveyed from the generator to the engine, and a collecting-chamber and discharge-passage outside the engine for the heavy oil.

10. In combination with a gas-engine, a generator exterior thereto consisting of inclosed imperforate retaining-surfaces over which the oil or crude petroleum is allowed to flow, means for heating these surfaces so that the gas or vapor contained in the oil is separated from the heavy non-volatilizable portion, a passage by which the volatilized portion is conveyed to the engine or receiver, a collecting-chamber outside the engine into which the non-volatilized portion flows by gravitation, a controlled discharge-passage therefrom, and a supply device whereby the oil or crude petroleum is fed to the retaining-surfaces only during the operation of the engine.

In witness whereof I have hereunto set my hand.

DANIEL BEST.

Witnesses:
S. HUFF,
CHAS. H. HALE.